US011692505B2

(12) United States Patent
Schmidt et al.

(10) Patent No.: US 11,692,505 B2
(45) Date of Patent: Jul. 4, 2023

(54) CYLINDER HEAD WITH INTEGRATED TURBOCHARGER

(71) Applicants: Michael P Schmidt, Highland, MI (US); Douglas Trudeau, Lake Orion, MI (US); Constantin Hagiu, Windsor (CA); Brian Jacobs, Romeo, MI (US)

(72) Inventors: Michael P Schmidt, Highland, MI (US); Douglas Trudeau, Lake Orion, MI (US); Constantin Hagiu, Windsor (CA); Brian Jacobs, Romeo, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/498,485

(22) Filed: Oct. 11, 2021

(65) Prior Publication Data

US 2022/0112860 A1 Apr. 14, 2022

Related U.S. Application Data

(60) Provisional application No. 63/090,323, filed on Oct. 12, 2020.

(51) Int. Cl.
| | |
|---|---|
| *F02F 1/42* | (2006.01) |
| *F02F 1/36* | (2006.01) |
| *F01M 13/02* | (2006.01) |
| *F01N 13/00* | (2010.01) |
| *F01N 13/10* | (2010.01) |
| *F02B 37/18* | (2006.01) |
| *F02M 35/10* | (2006.01) |

(52) U.S. Cl.
CPC ......... *F02F 1/4264* (2013.01); *F01M 13/028* (2013.01); *F01N 13/008* (2013.01); *F01N 13/10* (2013.01); *F02B 37/183* (2013.01); *F02F 1/36* (2013.01); *F02M 35/10144* (2013.01); *F02M 35/10157* (2013.01); *F02M 35/10222* (2013.01); *F02F 2200/06* (2013.01)

(58) Field of Classification Search
CPC .... F02F 1/4264; F02F 1/36; F02F 1/24; F02F 1/243; F02F 1/40; F02F 2200/06; F01M 13/028; F01M 2013/027; F01N 13/008; F01N 13/10; F01N 9/00; F02B 37/183; F02M 35/10144; F02M 35/10157; F02M 35/10222
See application file for complete search history.

(56) References Cited

U.S. PATENT DOCUMENTS 5,199,260 A * 4/1993 Iwick .................... F02B 37/186
 137/107
5,755,101 A * 5/1998 Free .................... F02D 41/0007
 60/602

(Continued)

*Primary Examiner* — Grant Moubry
(74) *Attorney, Agent, or Firm* — Ralph E. Smith

(57) ABSTRACT

A cylinder head assembly includes a cast cylinder head and a turbocharger housing integrally cast with the cylinder head. The integrated cylinder head and turbocharger housing includes: (i) a compact low wetted area to provide an uninterrupted flow path pointed directly at a catalyst face to facilitate achieving cold start emissions targets, (ii) a casting core assembly with specific core geometry and steps for assembly to enable core assembly while meeting all cylinder head and integrated turbine housing functional requirements, (iii) an oxygen sensor disposed pre-turbine in an integrated exhaust manifold, and (iv) a fully integrated PCV make-up air system.

20 Claims, 10 Drawing Sheets

(56) References Cited

U.S. PATENT DOCUMENTS

| | | | |
|---|---|---|---|
| 8,955,318 B2 | 2/2015 | Marques et al. | |
| 9,194,282 B2* | 11/2015 | Serres | F01D 17/105 |
| 2011/0173972 A1* | 7/2011 | Wade | F02F 1/243 |
| | | | 123/193.5 |
| 2013/0087128 A1* | 4/2013 | Valencia | F01M 13/022 |
| | | | 123/574 |
| 2013/0287564 A1* | 10/2013 | Fath | F02B 37/00 |
| | | | 415/213.1 |
| 2013/0291540 A1* | 11/2013 | Serres | F01D 17/105 |
| | | | 60/605.1 |
| 2015/0034029 A1* | 2/2015 | Obenaus | F02B 37/00 |
| | | | 123/41.82 R |
| 2015/0059339 A1* | 3/2015 | Zahdeh | F01N 13/10 |
| | | | 60/605.1 |
| 2017/0074158 A1* | 3/2017 | Nowak | F16K 31/04 |
| 2020/0347796 A1 | 11/2020 | Schmidt et al. | |
| 2020/0378333 A1* | 12/2020 | Wicks | F02F 1/40 |
| 2021/0010412 A1 | 1/2021 | Schmidt et al. | |

* cited by examiner

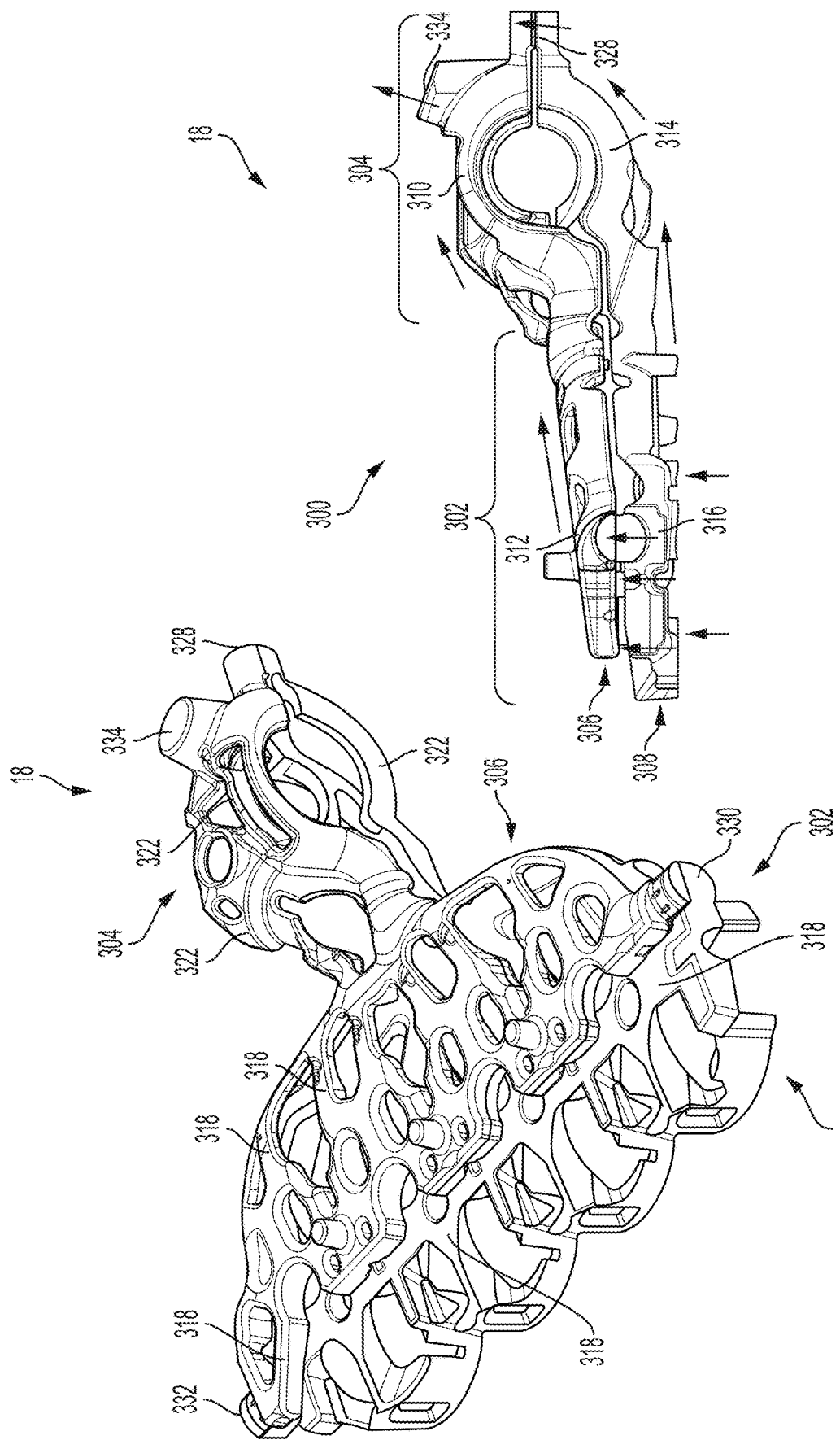

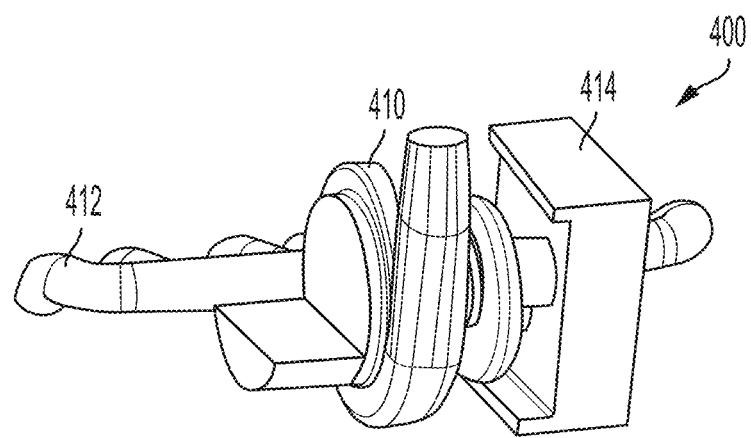
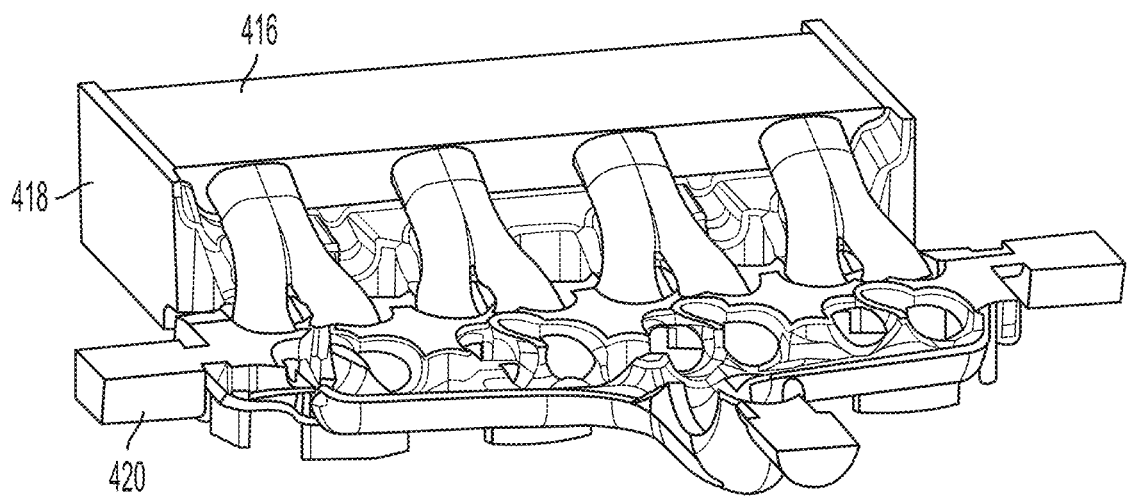
FIG. 9

CYLINDER HEAD WITH INTEGRATED TURBOCHARGER

CROSS REFERENCE TO RELATED APPLICATION

This application claims the benefit of U.S. Provisional Pat. App. 63/090,323 filed Oct. 12, 2020, the contents of which are incorporated herein by reference thereto.

FIELD

The present application relates generally to internal combustion engines having a turbocharger and, more particularly, to an internal combustion engine having a cylinder head with an integrated turbocharger.

BACKGROUND

Turbocharger systems typically account for a good portion of the cost of an engine. Moreover, typical gasoline engine turbine housings have significant amounts of nickel and chrome, thereby accounting for a large portion of the cost of the turbocharger. Further, gaskets, fasteners, mating tubes, ducts and other components associated with the turbocharger often need to be made of premium materials, for example, due to heat, pressure, and vibration induced from the turbocharger. Thus, while such turbocharger systems do work well for their intended purpose, it is desirable to provide continuous improvement in the relevant art by reducing cost and complexity.

SUMMARY

In accordance with one example aspect of the invention, a cylinder head assembly for an internal combustion engine is provided. In one example implementation, the assembly includes a cast cylinder head and a turbocharger housing integrally cast with the cylinder head. The integrated cylinder head and turbocharger housing include a turbine inlet duct configured to receive exhaust gas from the exhaust manifold and direct exhaust gas to a turbine disposed within the turbocharger housing, a wastegate inlet duct configured to receive exhaust gas from the exhaust manifold and bypass exhaust gas around the turbine, and an oxygen sensor disposed at least partially within the exhaust manifold and configured to sense an oxygen content of the exhaust gas flowing through the turbine inlet duct and/or the wastegate inlet duct.

In addition to the foregoing, the described cylinder head assembly may include one or more of the following features: wherein the oxygen sensor is configured to be utilized pre-turbine in full Lambda 1 engine operation; a water jacket cast into the integrally cast cylinder head and turbocharger housing, wherein the water jacket is configured to cool the oxygen sensor; an oxygen sensor port formed in a collector of the integrated exhaust manifold, wherein the oxygen sensor is disposed in the oxygen sensor port upstream of both the turbine inlet duct and the wastegate inlet duct; and a core assembly system for forming the cylinder head assembly, including a core assembly system having a turbo top core, a top core, an oil gallery core, an upper water jacket core, an intake scroll core, an exhaust port core, an exhaust side core, an intake port core, an intake side core, and a lower water jacket core.

In addition to the foregoing, the described cylinder head assembly may include one or more of the following features: a method of forming the cylinder head assembly with the core assembly system, including coupling the intake scroll core to the exhaust port core, and coupling the exhaust side core to the exhaust port core; providing the lower water jacket core, subsequently placing the intake side core with the lower water jacket core, and placing the intake port core at least partially into the intake side core and the lower water jacket core; lowering the joined intake scroll core, exhaust port core, and exhaust side core into the water jacket core, thereby allowing a hyper-elliptical shaped volute core to pass by the lower water jacket core and upper water jacket core during assembly to allow the location of a water jacket to be close to an exhaust volute for cooling thereof; and positioning the lower water jacket core, assembling the exhaust port core, positioning the exhaust port core by placing a chamber end into the lower water jacket, and lowering the exhaust port core such that an exhaust port volute passes by the lower water jacket core, and positioning the upper water jacket core such that it passes by the exhaust port volute.

In addition to the foregoing, the described cylinder head assembly may include one or more of the following features: a fully integrated PCV make-up air system configured to supply make-up air to the cylinder head for positive crankcase ventilation; a compressor inlet shroud coupled to a main turbocharger housing, wherein the integrated PCV make-up air system is integrated into the compressor inlet shroud and the turbocharger main housing; wherein the PCV make-up air system includes an MUA passage having a first passage formed in the compressor inlet shroud, and a second passage formed in the main turbocharger housing; and where the PCV make-up air system does not have an external connection for the make-up air.

In accordance with another example aspect of the invention, a cylinder head assembly for an internal combustion engine is provided. In one example implementation, the assembly includes a cast cylinder head and a turbocharger housing integrally cast with the cylinder head. The integrated cylinder head and turbocharger housing include a compact low wetted area to provide an uninterrupted flow path pointed directly at a catalyst face to facilitate achieving cold start emissions targets.

In addition to the foregoing, the described cylinder head assembly may include one or more of the following features: wherein the turbocharger housing further includes a wastegate housing defining a wastegate passage and a valve seat with a wastegate inlet; a wastegate system coupled to the turbocharger housing and having a wastegate valve assembly and a wastegate valve actuator assembly; wherein the wastegate valve actuator assembly is a direct drive actuator configured to open the wastegate valve assembly such that a wastegate valve is completely out of the wastegate flow path through the wastegate inlet duct such that the exhaust flow can be flowed directly onto the catalyst face; and wherein the wastegate valve is rotated from a sealed position over the wastegate inlet duct to greater than 90° to be completely out of the wastegate flow path.

In addition to the foregoing, the described cylinder head assembly may include one or more of the following features: wherein the wastegate valve is further rotated to at least 90° from the sealed position to increase wastegate flow by blocking exducer flow of a turbine wheel rotatably disposed within the turbocharger housing with a backside of the wastegate valve; and an integrated exhaust manifold, a turbine inlet duct configured to receive exhaust gas from the exhaust manifold and direct exhaust gas to a turbine disposed within the turbocharger housing, a wastegate inlet duct configured to receive exhaust gas from the exhaust manifold and bypass exhaust gas around the turbine, and an oxygen sensor disposed at least partially within the exhaust manifold and configured to sense an oxygen content of the exhaust gas flowing through the turbine inlet duct and/or the wastegate inlet duct.

In accordance with another example aspect of the invention, a cylinder head assembly for an internal combustion engine is provided. In one example implementation, the assembly includes a cast cylinder head and a turbocharger housing integrally cast with the cylinder head. The integrated cylinder head and turbocharger housing include (i) a compact low wetted area to provide an uninterrupted flow path pointed directly at a catalyst face to facilitate achieving cold start emissions targets, (ii) a casting core assembly with specific core geometry and steps for assembly to enable core assembly while meeting all cylinder head and integrated turbine housing functional requirements, (iii) an oxygen sensor disposed pre-turbine, in full Lambda 1 engine operation, vertical and centered in an integrated exhaust manifold, and (iv) a fully integrated PCV make-up air system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 6 is a perspective view of an example water jacket system that may be cast within the cylinder head of FIG. 1, in accordance with the principles of the present application;

FIG. 7 is a side view of the water jacket system shown in FIG. 6, in accordance with the principles of the present application;

FIG. 9 illustrates a first step when assembling the core assembly system shown in FIG. 8, in accordance with the principles of the present application;

DESCRIPTION

Figure 1:
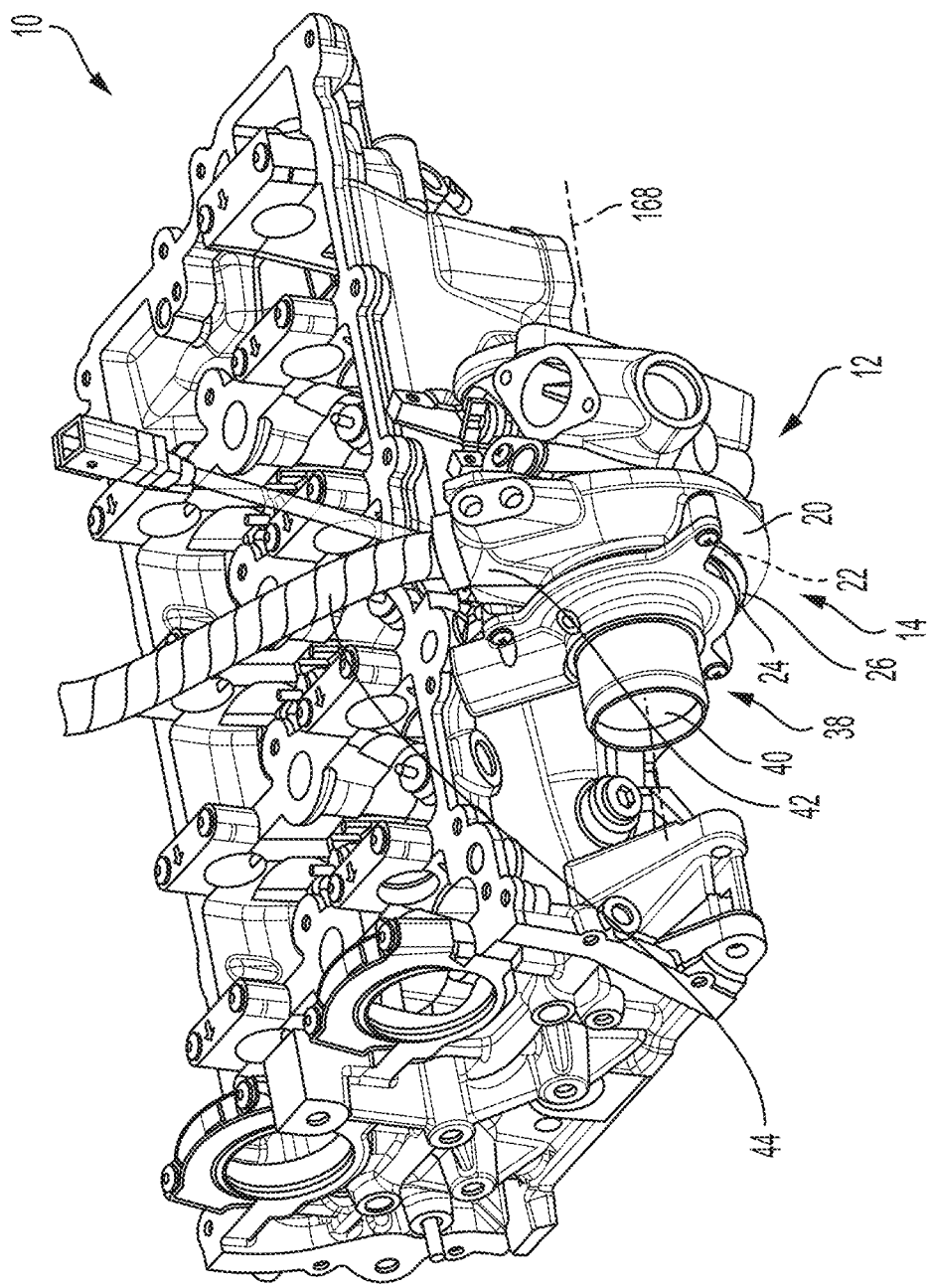
FIG. 1 is a perspective view of an example cylinder head casting with an integrally cast turbocharger housing in accordance with the principles of the present application.

Described herein are systems and methods for integrally casting features or components into the cylinder head of an internal combustion engine. Typically, an internal combustion engine is a compact mix of hardware often required to fit in very tight underhood spaces. When components with high mass and density, such as turbocharger systems, are bolted externally to an engine, the resulting structure can potentially affect NVH, dynamics, packaging, decking, durability, etc.

In order to reduce or prevent such issues in the present disclosure, the turbocharger housing is integrated (e.g., cast) into an aluminum cylinder head, which is advantageously configured to reduce engine cost, improve packaging, simplify assembly, reduce number of assembly steps, improve catalyst light off emissions, reduce turbocharger noise (e.g., wastegate resonances, flow noise, rotor group unbalance whine, etc.), improve engine warm up, and improve fuel economy.

Further, the disclosed system is optimized for cold start emissions, CARB compliance, and water cooling. One potential issue with water-cooled turbochargers is the potential loss of enthalpy to the cooling system, which can impact thermodynamic performance as well as cold start catalyst light off. However, the disclosed design includes a reverse rotating turbocharger with a wastegate position to direct the exhaust flow directly on the exhaust catalyst brick face, thereby significantly improving catalyst light off.

Further, traditional turbocharger housings are made of steel, which convects heat from the hot exhaust gasses to the ambient air. The steel mechanical properties are such that it achieves the required durability. Since in some examples of the present disclosure the turbocharger housing is integrated into an aluminum cylinder head, in order to maintain durability, water cooling passages and water flow rates are provided to properly maintain the aluminum material within temperatures that allow its strength to achieve the required durability. Thus, the water jacket is optimized to keep the metal temperature below the target value at any point in the turbine housing.

In one specific example, the water cooling passages maintain a turbine tongue of the turbocharger below a predetermined temperature to ensure no cylinder head cracks propagate to the water jacket. This is accomplished by providing a turbine housing layout that allows the coolant as close as possible to the tongue to enable adequate cooling while still manufacturing with conventional sand cast methods. In the example, the turbine housing is designed with a hyper-elliptical volute shape "squashing" to allow the volute core to pass by the water jacket cores during assembly. This provides a desired rectangular cross-sectional shape of the exhaust volute at the closes point of core pass-by to each the upper and lower water jacket In some examples, the disclosed design is configured to cool the turbocharger housing's aluminum exhaust passages by providing turbocharger housing water jackets. The water jackets include an upper and lower water jacket connected at multiple points including cup plugs and drilled holes. In one example, coolant from the block water jacket is metered by the head gasket into the cylinder head lower water jacket at both the intake and exhaust valve bridges. Water flow streams merge above the combustion chambers, and subsequently flow below the integrated exhaust port passages toward the integrated turbine housing.

The upper water jacket flows in parallel and receives water from the lower water jacket directly above the combustion chambers. The upper water jacket flows coolant around the exhaust valve guides, over the integrated exhaust port passages, and then above the integrated turbine housing. After wrapping around the turbine housing, the water jacket flow streams merge together to form a common water outlet, high in elevation to prevent trapping air during operation. The coolant flow targets critical areas of the turbine (e.g., volute, tongue, wastegate), yet is selective in are areas to limit the overall heat rejection of the system. In this way, the water flow passages above and below the turbine housing minimize heat rejection, achieve water velocity and metal temperature targets, and achieve structural targets for low cycle fatigue.

In additional examples of the present disclosure, due to the water cooled turbine, one or more oxygen sensors may be utilized pre-turbine when the engine is controlled in full Lambda 1 operation as the water jacket also cools critical components of the oxygen sensor. In this way, the oxygen sensor can be vertically oriented and centered in the integrated exhaust manifold collector before the wastegate channel and volute. Lambda 1 refers to an engine operating state where lambda=1, which means stoichiometric engine/combustion operation. With this stoichiometric operation, after combustion there should not be excess oxygen or unburnt fuel in the exhaust gases.

In additional examples of the present disclosure, a PCV make-up air system is fully integrated into the turbocharger housing and cylinder head, thus obviating the need for external tubes or hoses, which can require an active onboard diagnostics monitoring for disconnection of the tubes/hoses.

Accordingly, the systems described herein provide a cast cylinder head with an integrally cast turbocharger housing that includes (i) a very compact low wetted area to provide an uninterrupted flow path pointed directly at the catalyst face to achieve cold start emissions targets, (ii) a casting core assembly with specific core geometry and steps for assembly to enable core assembly while meeting all cylinder head and integrated turbine housing functional requirements, (iii) an oxygen sensor disposed pre-turbine, for use in full Lambda 1 engine operation, vertical and centered in the integrated exhaust manifold, (iv) a fully integrated PCV make-up air system, (v) a water jacket cast into the integrally cast cylinder head and turbocharger housing, wherein the water jacket is configured to cool the oxygen sensor so as to enable placement of the oxygen sensor at least partially within the integrated exhaust manifold, and (vi) a wastegate housing defining a wastegate passage and a valve seat with a wastegate inlet.

Figure 2:
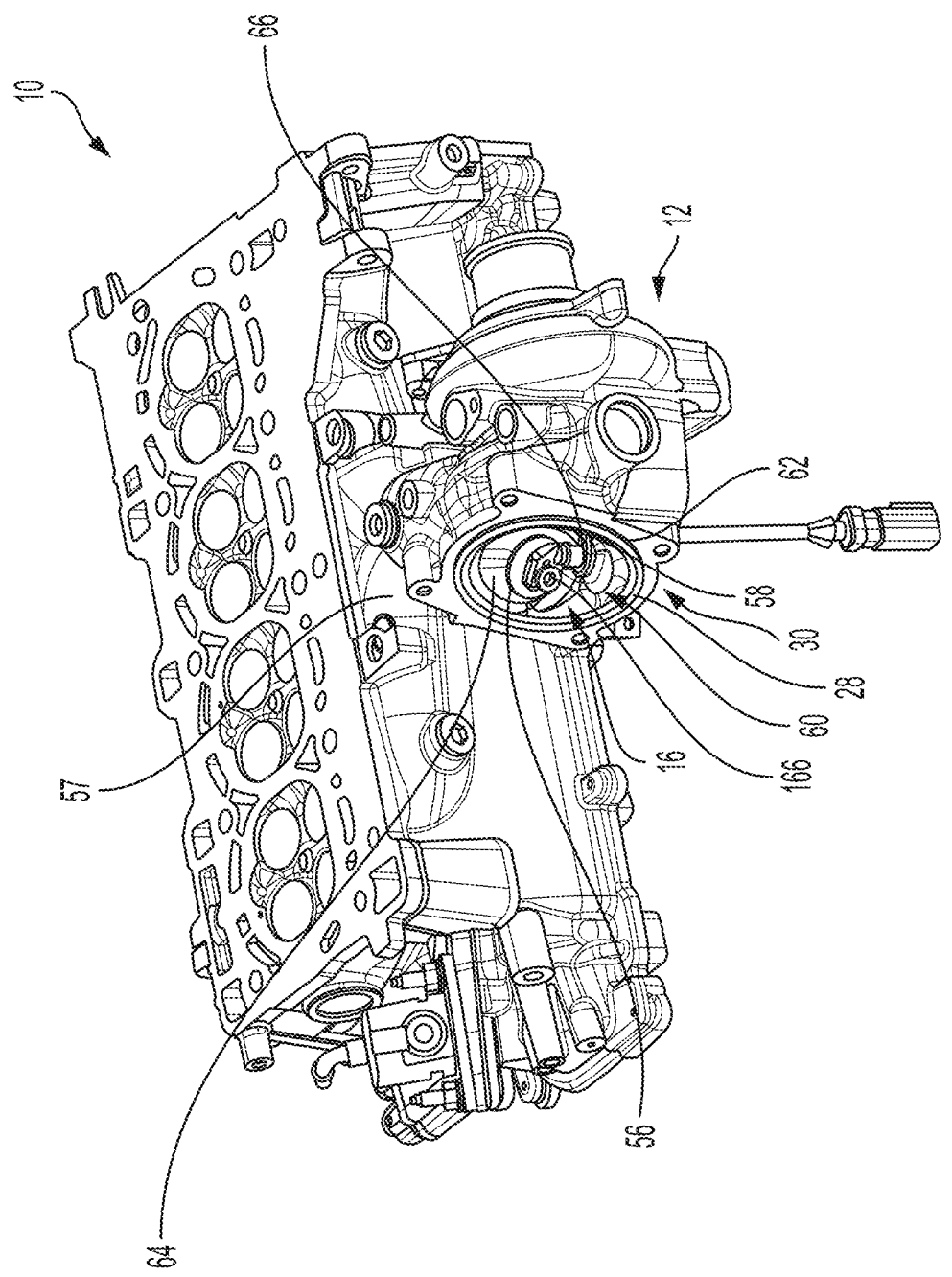
FIG. 2 is another perspective view of the example cylinder head shown in FIG. 1, in accordance with the principles of the present application.
Figure 3:
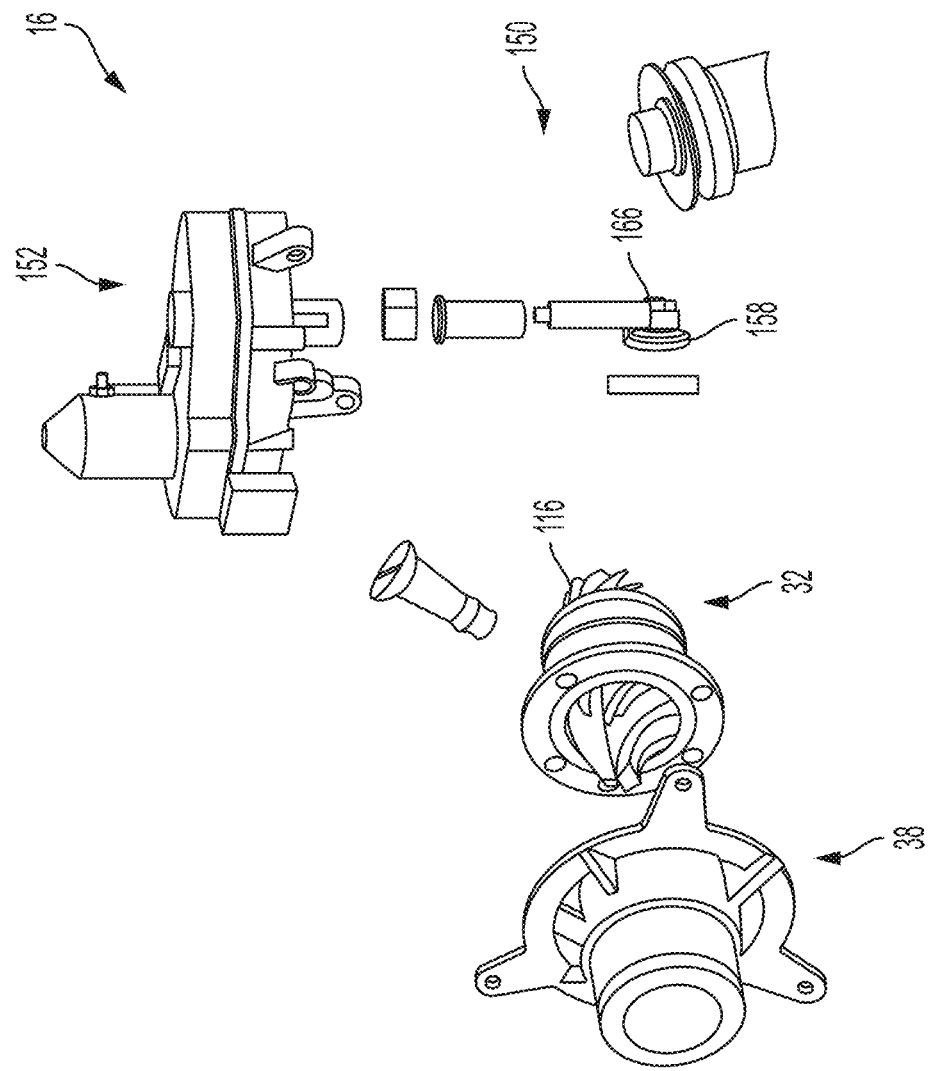
FIG. 3 is an exploded view of portions of an example turbocharger shown in FIGS. 1 and 2, in accordance with the principles of the present application.
Figures 4, 5:
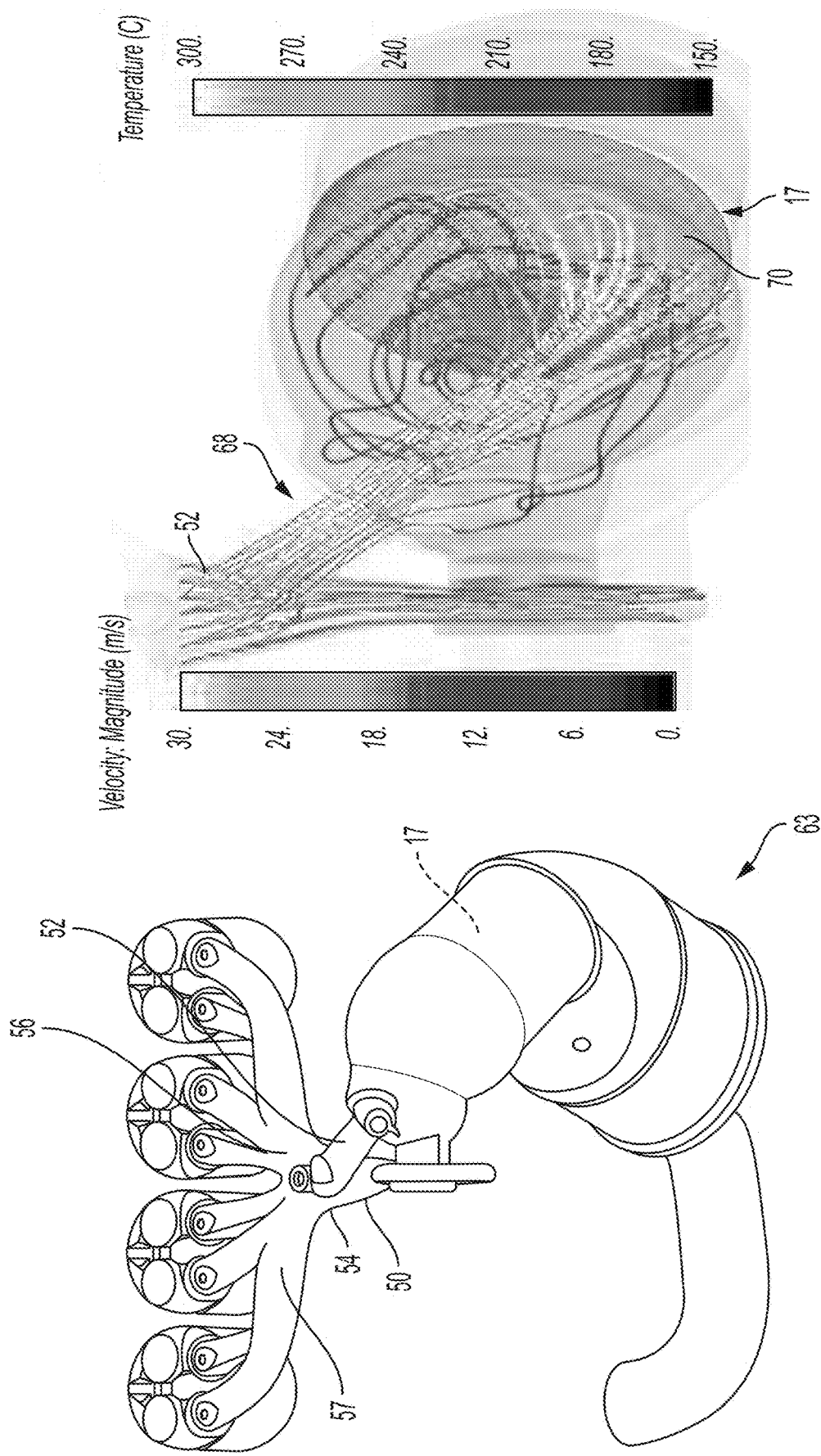
FIG. 4 illustrates the turbocharger housing configured to direct wastegate flow directly onto a catalyst of an exhaust aftertreatment system, in accordance with the principles of the present application.
FIG. 5 illustrates an example flow and temperature of the wastegate flow directed onto the catalyst shown in FIG. 4, in accordance with the principles of the present application.
Figure 8:
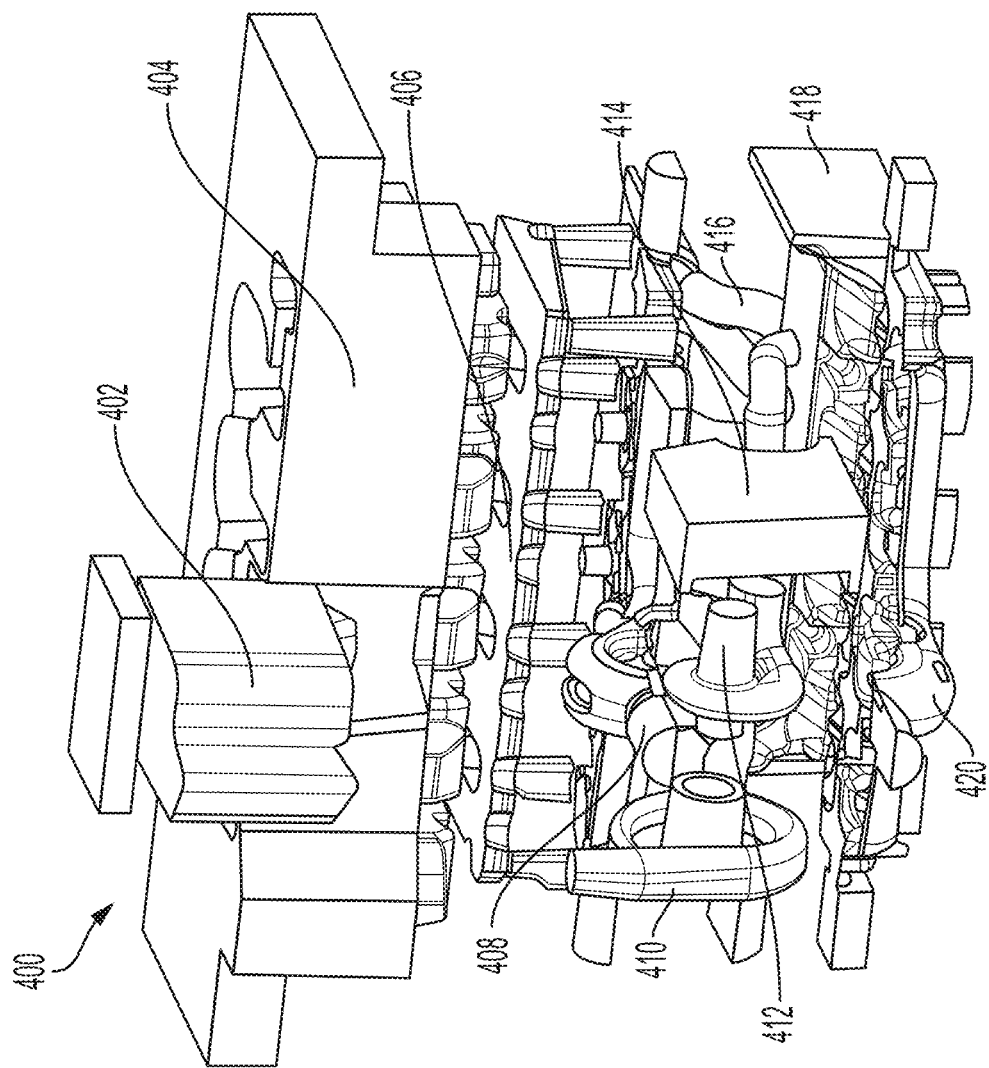
FIG. 8 is an exploded view of an example core assembly system having sand castings for manufacturing the cylinder head of FIG. 1, in accordance with the principles of the present application.
Figure 11:
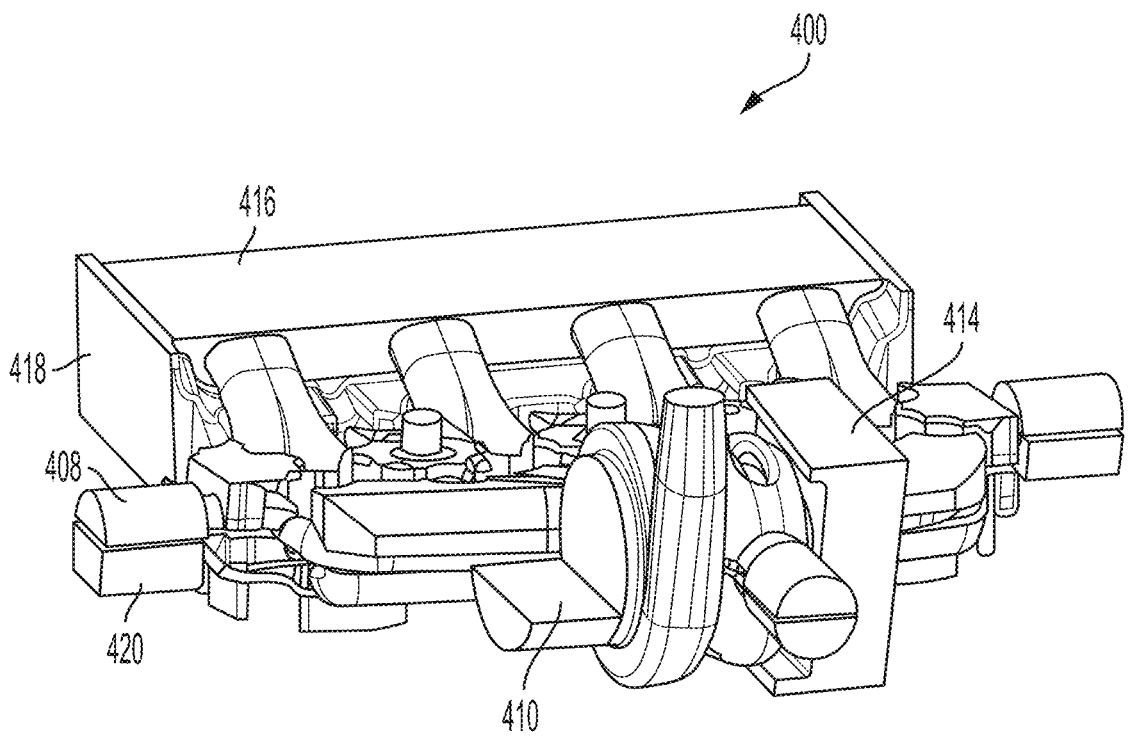
FIG. 11 illustrates a third step when assembling the core assembly system shown in FIG. 8, in accordance with the principles of the present application.
Figure 12:
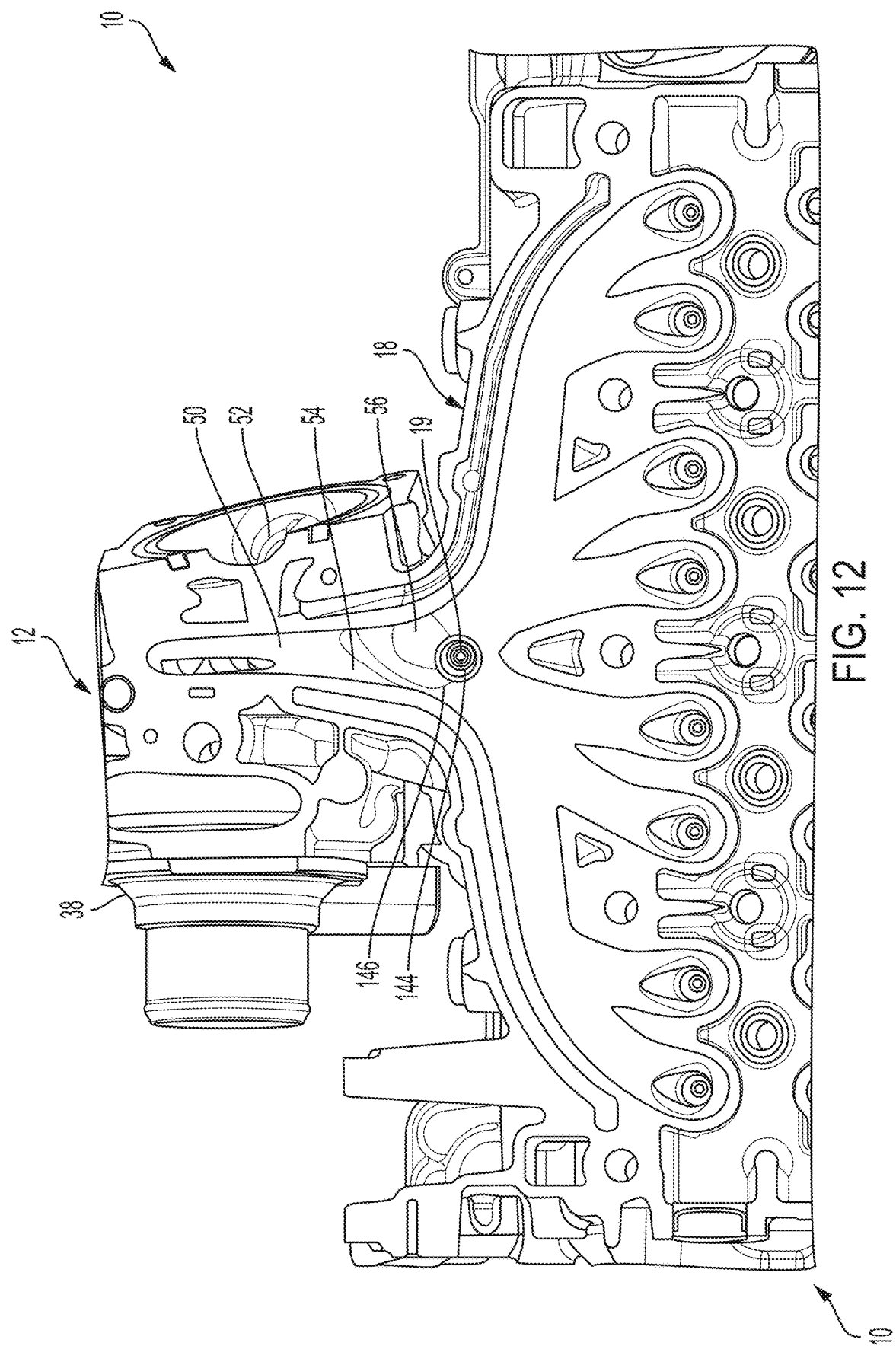
FIG. 12 is a sectional view of a portion of the turbocharger housing of FIG. 1 and illustrating an example oxygen sensor oriented and arranged within the water jacket system, in accordance with the principles of the present application.
Figure 13:
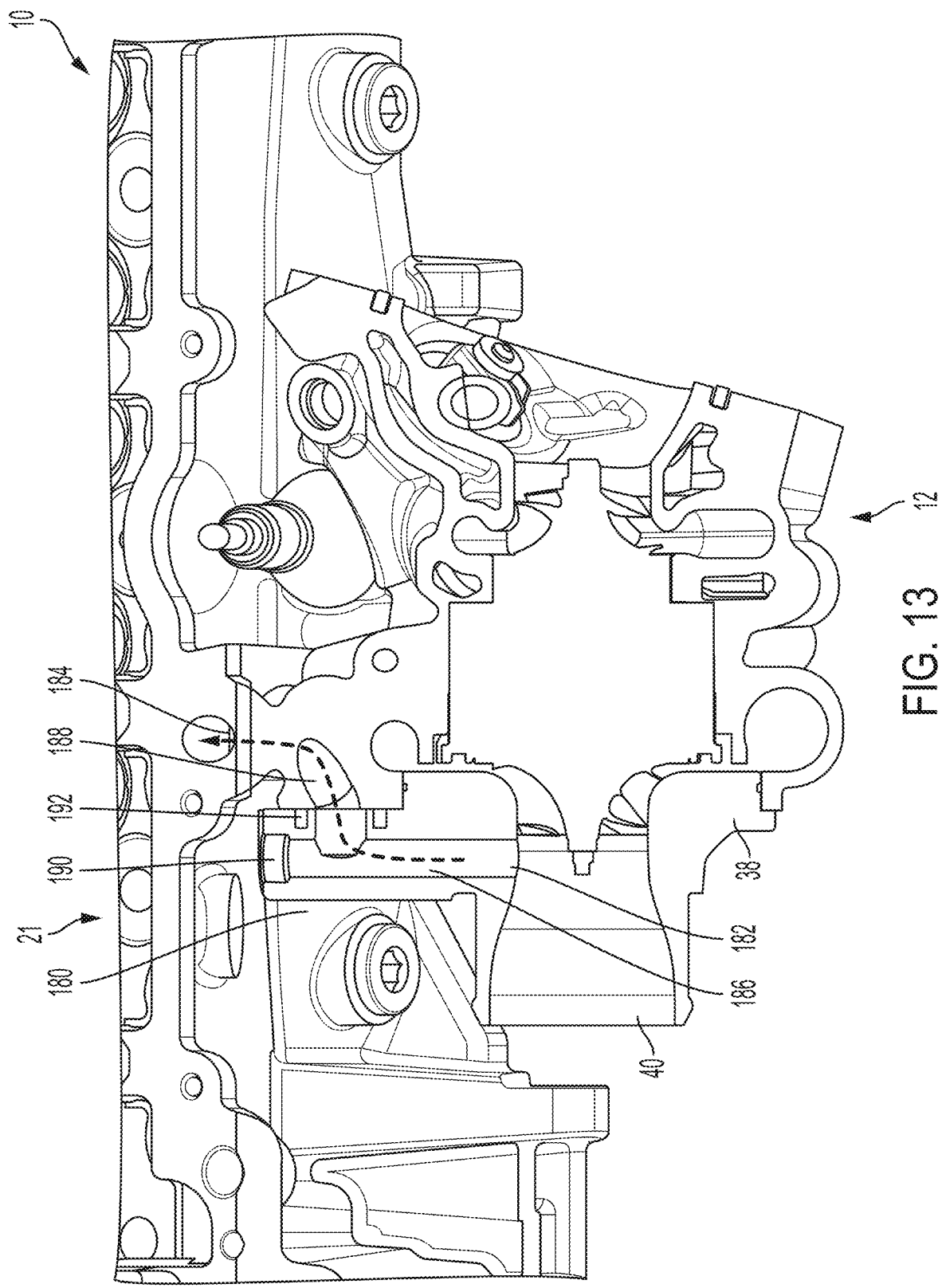
FIG. 13 is a sectional view of a portion of the turbocharger housing of FIG. 1 and illustrating an integrated example PCV make-up air system in accordance with the principles of the present application.

With reference now to FIGS. 1 and 2, the present disclosure illustrates an example cylinder head for an internal combustion engine is shown and indicated at reference numeral 10. In the example embodiment, the cylinder head 10 includes an integrated (cast-in) turbocharger housing 12 that makes up part of a turbocharger assembly 14 (see also FIG. 3). As shown in FIG. 3, a wastegate system 16 is fully integrated into the turbocharger housing 12. FIGS. 4 and 5 illustrate turbocharger housing 12 providing wastegate flow directly onto a catalyst 17 to facilitate catalyst light-off during a cold start. FIGS. 6 and 7 illustrate an example water jacket system 18 for providing cooling to one or more portions of the integrated turbocharger housing 12 and/or integrated wastegate system 16. FIGS. 8-11 illustrate example sand castings for manufacturing the cylinder head 10, turbocharger housing 12, and water jacket system 18. FIG. 12 illustrates an example oxygen sensor 19 and orientation and arrangement within the water jacket system 18. FIG. 13 illustrates a PCV make-up air system 21 fully integrated into the turbocharger housing 12.

With continued reference to FIGS. 1 and 2, the turbocharger assembly 14 will be described in more detail. In the example embodiment, the turbocharger housing 12 is cast with the cylinder head 10 and generally includes a main housing 20 defining a cartridge bore 22, an inlet flange 24 defining a cartridge opening 26, and an outlet flange 28 defining an exhaust outlet 30. The cartridge bore 22 is configured to receive a turbocharger cartridge assembly 32 (FIG. 3).

As described herein in more detail, the cartridge opening 26 is configured to receive cartridge assembly 32 therein, followed by a compressor inlet shroud 38, to define a compressor inlet 40, as shown in FIG. 1. The compressor inlet 40 is fluidly coupled to a compressor outlet 42 of a compressor outlet duct 44, which is configured to provide compressed intake air to an intake manifold of the engine (not shown).

In the example embodiment, the turbocharger housing 12 includes an integrated (cast-in) turbine inlet duct 50 and wastegate inlet duct 52 (see also FIGS. 4 and 12), which are respectively coupled to a turbine inlet 54 and a wastegate inlet 56 (FIG. 12). The turbine inlet 54 is configured to receive exhaust gas from an exhaust manifold 57 of the engine (FIG. 2), and direct the exhaust gas through a turbine outlet 58 formed in the turbocharger housing 12. As shown in FIG. 2, the turbine outlet 58 is configured to supply exhaust from the turbine of the cartridge assembly 32 to a wastegate passage 60 defined by a wastegate housing 62 of the turbocharger housing 12. The exhaust from the wastegate passage 60 is then supplied via exhaust outlet 30 to an exhaust system 63 of the vehicle (FIG. 4). As described herein in more detail, the wastegate housing 62 defines a valve seat 64 including the wastegate inlet 56, and a wastegate actuator bore 66.

As shown in FIG. 3, wastegate system 16 generally includes a wastegate valve assembly 150 and a wastegate valve actuator assembly 152. The wastegate valve assembly 150 and the wastegate valve actuator assembly 152 are coupled to the integrated turbocharger housing 12, which as noted above, includes the wastegate housing 62 that defines wastegate passage 60, valve seat 64 with wastegate inlet 56, and wastegate actuator bore 66. In the example embodiment, the wastegate valve assembly 150 generally includes a bushing 154, a coupling 156, and a wastegate valve 158.

The bushing 154 is inserted through the wastegate actuator bore 66 and includes an upper end configured to couple to the coupling 156, and a lower end configured to receive and couple to a shaft 160 of the wastegate valve 158. The wastegate valve 158 is inserted into the wastegate passage 60 for subsequent coupling to the bushing 154. In one example, the shaft 160 is splined to the bushing 154, however it will be appreciated that various couplings are envisioned.

Moreover, in the illustrated example, the coupling 156 is one side of an Oldham coupling 162, which includes an intermediate member 164 disposed between first coupling 156 and a second coupling 176 of the wastegate valve actuator assembly 152. In this way, the Oldham coupling 162 is configured to operably couple the wastegate valve actuator assembly 152 to the wastegate valve assembly 150. However, it will be appreciated that wastegate system 16 may have any suitable coupling between the wastegate valve actuator assembly 152 and the wastegate valve assembly 150 that enables system 16 to function as described herein.

In the example embodiment, the wastegate valve actuator assembly 152 is a direct drive actuator and generally includes a housing 170 for housing a motor 172 having an output shaft 174, which is configured to couple to coupling 176. The direct drive actuator advantageously enables opening of the wastegate beyond the typical 30° maximum to beyond 90° as far as is needed to fully bypass the wastegate inlet duct 52. In some examples, the wastegate is opened beyond 180° to increase wastegate flow by blocking exducer flow of the turbine wheel 116 with a backside 166 of the wastegate valve 158.

Additionally, in some examples, the turbocharger housing 12 includes a reverse rotation configuration (e.g., rotates counter clockwise as shown in FIG. 1) with the integrated direct drive wastegate system 16. In some examples the wastegate system 16 is optimized so the wastegate valve 158 is completely out of the wastegate flow path through wastegate inlet duct 52 (e.g., oriented between 110°-160°, or at 135°, etc.) so that a large portion of the exhaust flow can be directed onto the catalyst brick face 17. Additionally, the reverse rotation turbocharger arrangement moves a turbocharger shaft centerline 168 (FIG. 1) closer to the engine combustion chambers (not shown) to provide a very compact, low wetted area flow path that points directly at the brick face uninterrupted, as described herein in more detail.

As shown in FIGS. 4 and 5, the wastegate inlet duct 52 is oriented toward the catalyst 17, which is positioned within the exhaust aftertreatment system 63. In the illustrated orientation, the exhaust gas 68 is flowed directly onto the catalyst brick face 70. Because it can be difficult to achieve emissions targets during a cold start condition due to a large part of the exhaust energy being consumed for the expansion work of the turbine, the wastegate system 16 bypasses the exhaust flow before it reaches the turbine wheel 116, and directs the exhaust flow towards the catalyst 17. By reducing the length of the flow path of duct 52 and wetted surface area compared to some known systems, catalyst light off times can be drastically reduced and cold start emissions standards met in short order.

FIGS. 6 and 7 illustrate the water jacket system 18, which generally include a turbocharger housing water jacket and/or wastegate housing water jacket configured to provide a flow of coolant (e.g., water) around the integrated turbocharger housing 12 for cooling thereof. In some examples, the turbocharger housing water jackets include cooling passages around the wastegate features in order to provide cooling to the aluminum housing. This enables the integrated turbocharger housing to attach directly to the engine's emissions control catalyst inlet. Such systems may incorporate separate, independent, or partially connected water jackets to cool the wastegate support features and/or surrounding exhaust passage from the turbocharger turbine wheel to the housing outlet. In this way, the wastegate housing assembly can be integrated to the cylinder head and turbocharger housing casting, with water jackets added.

The water jacket systems 18 are shown as a water jacket core 300 that, after casting, represents a space or void cast into the cylinder head 10 and integrated turbocharger housing 12. The void subsequently defines one or more passages to receive a flow of coolant for cooling the cylinder head 10 and turbocharger housing 12. As such, in the illustrated example, the volume for coolant flow is represented in solid.

In the example embodiment, the water jacket core 300 generally includes a cylinder head water jacket portion 302 and a turbocharger housing water jacket portion 304. The cylinder head water jacket portion 302 is integrated (cast) into the cylinder head 10, and the turbocharger housing water jacket portion 304 is integrated (cast) into the turbocharger housing 12. In the illustrated example, the cylinder head water jacket portion 302 is fluidly coupled to the turbocharger housing water jacket portion 304, and water jacket portions 302, 304 are formed by an upper water jacket 306 and a lower water jacket 308.

The upper water jacket 306 defines an upper turbocharger housing water jacket 310 integrated (e.g., fluidly coupled) with an upper cylinder head water jacket 312, and the lower water jacket 308 defines a lower turbocharger housing water jacket 314 integrated with a lower cylinder head water jacket 316. The upper and lower cylinder head water jackets 312, 316 each define a plurality of passages 318 (shown in solid, not all labeled) to enable coolant to flow therethrough and provide cooling to various cylinder head components including the exhaust manifold 57. Similarly, the upper and lower turbocharger housing water jackets 310, 314 define a plurality of passages 322 (shown in solid, not all labeled) for flowing coolant around the integrated turbocharger housing 12 for cooling thereof, including a turbine exhaust flow and a wastegate exhaust flow such as, for example, exhaust flow 68 (FIG. 5).

As shown, the upper and lower turbocharger housing water jackets 310, 314 merge (fluidly connect) at an end coupling 328 of the turbocharger housing 12. Similarly, the upper and lower cylinder head water jackets 312, 316 merge at end couplings 330, 332, and the upper cylinder head water jacket 312 includes a coolant outlet 334 to a thermostat (not shown). In the illustrated arrangement, flow of coolant can begin in the lower cylinder head water jacket 316 and flow through passages 318 to the lower turbocharger housing water jacket 314 to cool the turbocharger housing 12. The flow then passes to upper turbocharger housing water jacket 310 via end coupling 328, further cools turbocharger housing 12, and finally flows through coolant outlet 334. Additionally, flow from the lower cylinder head water jacket 316 passes through end couplings 330, 332 into upper cylinder head water jacket 312, through passages 318, and finally through coolant outlet 334. It will be appreciated, however, that various other flow control arrangements are contemplated depending on various design considerations (e.g., materials, packaging requirements), desired temperature and flow characteristics, etc.

FIGS. 8-11 illustrate an example core assembly system 400 which is utilized to manufacture the integrally cast cylinder head 10. In the example implementation, core assembly system 400 generally includes a turbo top core 402, a top core 404, an oil gallery core 406, an upper water jacket core 408, an intake scroll core 410, an exhaust port core 412, an exhaust side core 414, an intake port core 416, an intake side core 418, and a lower water jacket core 420. As shown in FIG. 9, in one example method, the intake scroll core 410 and the exhaust side core 414 are coupled to the exhaust port core 412, for example, via an adhesive. In another step, the lower water jacket core 420 is provided first, and the intake side core 418 is subsequently placed with the lower water jacket core 420. The intake port core 416 is then placed at least partially into the intake side core 418 and the lower water jacket core 420.

Figure 10:
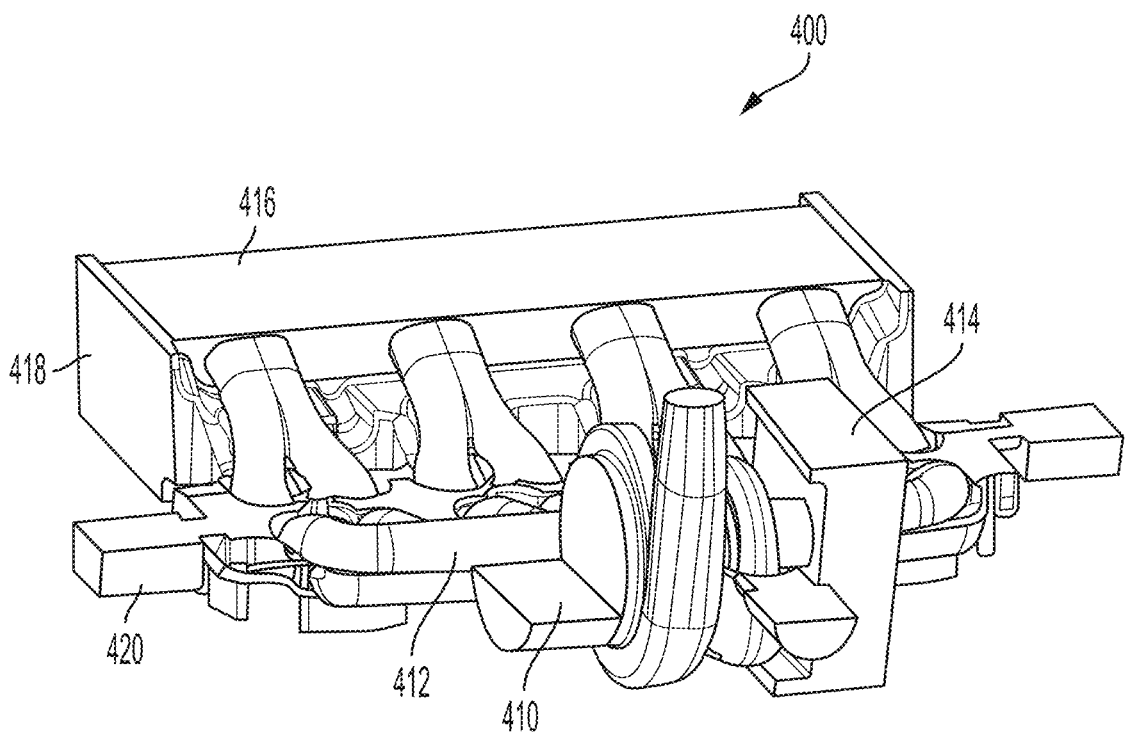
FIG. 10 illustrates a second step when assembling the core assembly system shown in FIG. 8, in accordance with the principles of the present application.

In a third step, the joined intake scroll core 410, exhaust port core 412, and exhaust side core 414 are lowered into the lower water jacket core 420, as shown in FIG. 10. Because the turbocharger housing 12 is designed with a hyper-elliptical shape "squashing," the volute core (e.g., defined by exhaust port core 412) is allowed to pass by the lower water jacket core 420 and upper water jacket core 408 during assembly. Due to the order of sand core assembly, the exhaust volute must fit within the lower water jacket core 420 and have sufficient wall thickness per standard casting practices. The exhaust port core 412 features three core supports that locate the core 412 in the base of the mold in two planes (horizontal and vertical). This ensures the exhaust port core 412 can sufficiently assemble into the lower water jacket core 420. In a subsequent step, the upper water jacket core 408 is assembled over the exhaust port core 412, as shown in FIG. 11. As such, the hyper-elliptical narrow exhaust volute facilitates a feasible core assembly process, while maintaining water jacket location close to the exhaust volute for proper cooling.

With reference now to FIG. 12, an additional feature of the cylinder head 10 is illustrated. In the example embodiment, an oxygen sensor port 144 is formed in the integrated exhaust manifold collector 146 and configured to receive oxygen sensor 19, which is configured to sense an oxygen content of the exhaust gases flowing through the turbine inlet duct 50 and/or the wastegate inlet duct 52. In the illustrated arrangement, the oxygen sensor 19 is disposed in a vertical orientation (e.g., to reduce condensation, corrosion, etc.) and located upstream of both the turbine inlet duct 50 and the wastegate inlet duct 52. Additionally, the oxygen sensor 19 is centered in the integrated exhaust manifold collector 146, and is advantageously cooled by the water jacket system 18, which is located in close proximity thereof. As such, due to the water cooling of the turbine portion of the turbocharger main housing 20, oxygen sensor 19 can be utilized pre-turbine in full Lambda 1 engine operation applications since the water jacket 300 also cools critical components of the oxygen sensor 19.

Turning now to FIG. 13, the integrated cylinder head 10 and turbocharger housing 12 also include the example PCV make-up air system 21, which is integrated into the compressor inlet shroud 38 and turbocharger main housing 20. In the example embodiment, PCV make-up air system 21 generally includes an MUA passage 180 having an inlet 182, an outlet 184, a first passage 186, and a second passage 188. The first passage 186 may be formed by a drilling operation and includes the inlet 182 as well as an open end 190, which is configured to receive a plug (not shown). The second passage 188 includes the outlet 184 and is fluidly coupled between the first passage 186 and the cylinder head 10. A seal 192 (e.g., O-ring) is disposed about the second passage 188 for fluid sealing thereof. In this way, the MUA passage 180 is configured to supply make-up air to the cylinder head 10 for positive crankcase ventilation. Because the MUA passage 180 is integrated into the compressor inlet shroud 38, a separate external connection (e.g., a hose, a tube) is not required. Accordingly, one or more active monitoring systems for detecting a disconnection/leak of the external connection are not required, thus providing cost savings and system simplification.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A cylinder head assembly for an internal combustion engine, comprising:
   a cast cylinder head; and
   a turbocharger housing integrally cast with the cylinder head,
   wherein the integrally cast cylinder head and turbocharger housing comprises:
      a turbine inlet duct configured to receive exhaust gas from an integrated exhaust manifold and direct exhaust gas to a turbine disposed within the turbocharger housing;
      a wastegate inlet duct configured to receive exhaust gas from the exhaust manifold and bypass exhaust gas around the turbine;
      a fully integrated PCV make-up air system configured to supply make-up air to the cylinder head for positive crankcase ventilation; and
      a compressor inlet shroud coupled to the turbocharger housing, wherein the integrated PCV make-up air system is integrated into the compressor inlet shroud and the turbocharger housing.

2. The cylinder head assembly of claim 1, wherein the PCV make-up air system includes an MUA passage having a first passage formed in the compressor inlet shroud, and a second passage formed in the turbocharger housing.

3. The cylinder head assembly of claim 1, where the PCV make-up air system does not have an external connection for the make-up air.

4. A cylinder head assembly for an internal combustion engine, comprising:
   a cast cylinder head; and
   a turbocharger housing integrally cast with the cylinder head,
   wherein the integrally cast cylinder head and turbocharger housing comprises:
      a compact low wetted area to provide an uninterrupted flow path pointed directly at a catalyst face to facilitate achieving cold start emissions targets.

5. The cylinder head assembly of claim 4, further comprising an oxygen sensor disposed at least partially within an integrated exhaust manifold and configured to sense an oxygen content of exhaust gas flowing through a turbine inlet duct and/or a wastegate inlet duct.

6. The cylinder head assembly of claim 5, further comprising a water jacket cast into the integrally cast cylinder head and turbocharger housing, wherein the water jacket is configured to cool the oxygen sensor so as to enable placement of the oxygen sensor at least partially within the integrated exhaust manifold.

7. The cylinder head assembly of claim 5, wherein the oxygen sensor is configured to be utilized pre-turbine in full Lambda 1 engine operation.

8. The cylinder head assembly of claim 5, further comprising an oxygen sensor port formed in a collector of the integrated exhaust manifold,
wherein the oxygen sensor is disposed in the oxygen sensor port upstream of both the turbine inlet duct and the wastegate inlet duct.

9. The cylinder head assembly of claim 4, further comprising a core assembly system for forming the cylinder head assembly, the system comprising:
a turbo top core;
a top core;
an oil gallery core;
an upper water jacket core;
an intake scroll core;
an exhaust port core;
an exhaust side core;
an intake port core;
an intake side core; and
a lower water jacket core.

10. A method of forming the cylinder head assembly of claim 7 with the core assembly system, the method comprising:
coupling the intake scroll core to the exhaust port core; and
coupling the exhaust side core to the exhaust port core.

11. The method of claim 10, further comprising:
providing the lower water jacket core;
subsequently placing the intake side core with the lower water jacket core;
placing the intake port core at least partially into the intake side core and the lower water jacket core; and
lowering the joined intake scroll core, exhaust port core, and exhaust side core into the water jacket core, thereby allowing a hyper-elliptical shaped volute core to pass by the lower water jacket core and upper water jacket core during assembly to allow the location of a water jacket to be close to an exhaust volute for cooling thereof.

12. The method of claim 10, further comprising:
positioning the lower water jacket core;
assembling the exhaust port core;
positioning the exhaust port core by placing a chamber end into the lower water jacket, and lowering the exhaust port core such that an exhaust port volute passes by the lower water jacket core; and
positioning the upper water jacket core such that it passes by the exhaust port volute.

13. The cylinder head assembly of claim 4, further comprising a fully integrated PCV make-up air system configured to supply make-up air to the cylinder head for positive crankcase ventilation.

14. The cylinder head assembly of claim 4, wherein the turbocharger housing further includes a wastegate housing defining a wastegate passage and a valve seat with a wastegate inlet.

15. The cylinder head assembly of claim 14, further comprising a wastegate system coupled to the turbocharger housing and having a wastegate valve assembly and a wastegate valve actuator assembly.

16. The cylinder head assembly of claim 15, wherein the wastegate valve actuator assembly is a direct drive actuator configured to open the wastegate valve assembly such that a wastegate valve is completely out of the wastegate flow path through the wastegate inlet such that the exhaust flow can be flowed directly onto the catalyst face.

17. The cylinder head assembly of claim 16, wherein the wastegate valve is rotated from a sealed position over the wastegate inlet to greater than 90° to be completely out of the wastegate flow path.

18. The cylinder head assembly of claim 16, wherein the wastegate valve is further rotated to at least 90° from the sealed position to increase wastegate flow by blocking exducer flow of a turbine wheel rotatably disposed within the turbocharger housing with a backside of the wastegate valve.

19. The cylinder head assembly of claim 4, further comprising;
an integrated exhaust manifold;
a turbine inlet duct configured to receive exhaust gas from the exhaust manifold and direct exhaust gas to a turbine disposed within the turbocharger housing;
a wastegate inlet duct configured to receive exhaust gas from the exhaust manifold and bypass exhaust gas around the turbine; and
an oxygen sensor disposed at least partially within the exhaust manifold and configured to sense an oxygen content of the exhaust gas flowing through the turbine inlet duct and/or the wastegate inlet duct.

20. A cylinder head assembly for an internal combustion engine, comprising:
a cast cylinder head; and
a turbocharger housing integrally cast with the cylinder head,
wherein the integrally cast cylinder head and turbocharger housing comprises:
(i) a compact low wetted area to provide an uninterrupted flow path pointed directly at a catalyst face to facilitate achieving cold start emissions targets,
(ii) a casting core assembly wherein an intake scroll core is coupled to an exhaust port core and an exhaust side core is coupled to the exhaust port core,
(iii) an oxygen sensor disposed pre-turbine at least partially within an integrated exhaust manifold,
(iv) a fully integrated PCV make-up air system,
(v) a water jacket cast into the integrally cast cylinder head and turbocharger housing, wherein the water jacket is configured to cool the oxygen sensor so as to enable placement of the oxygen sensor at least partially within the integrated exhaust manifold, and
(vi) a wastegate housing defining a wastegate passage and a valve seat with a wastegate inlet.

* * * * *